Patented Apr. 21, 1936

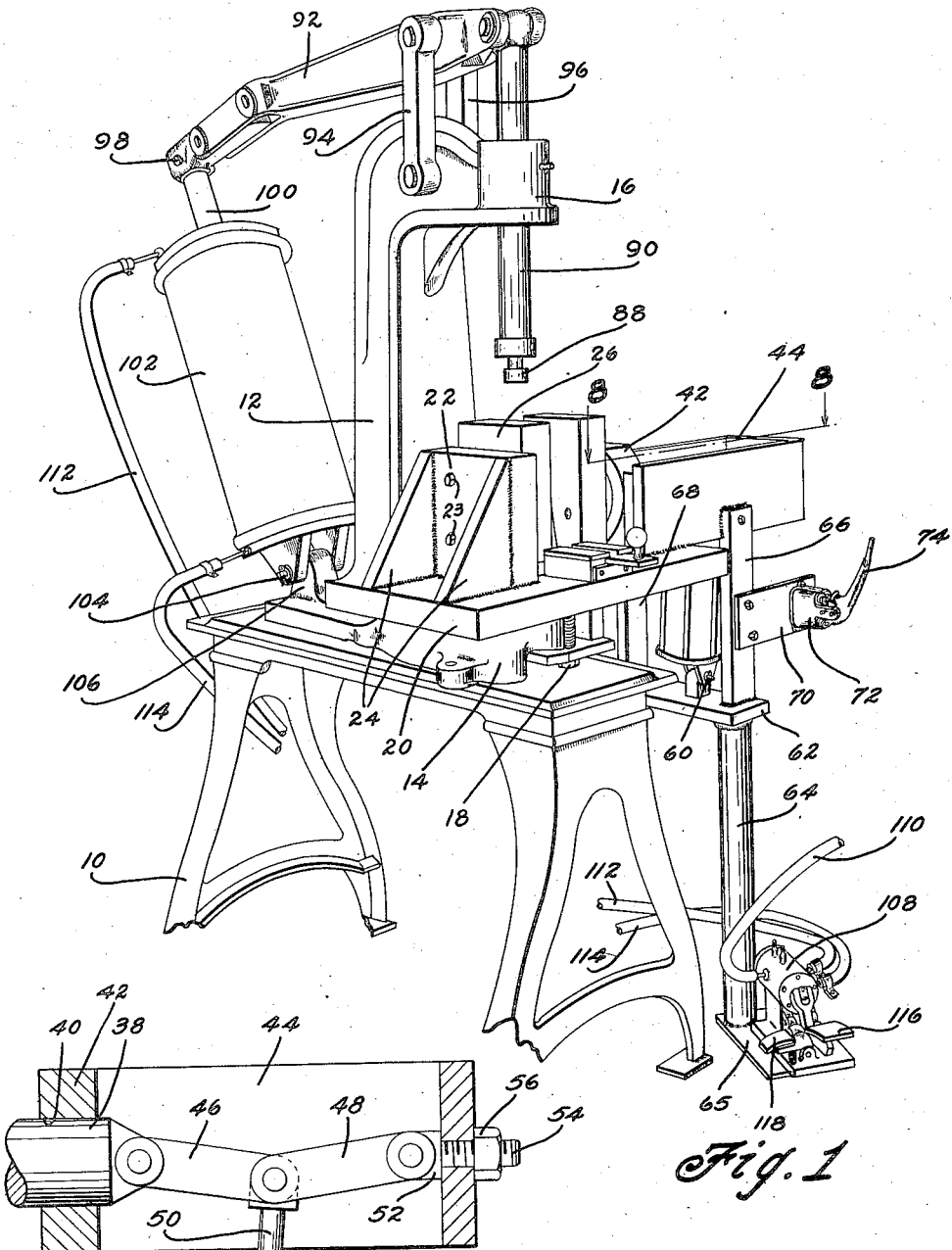

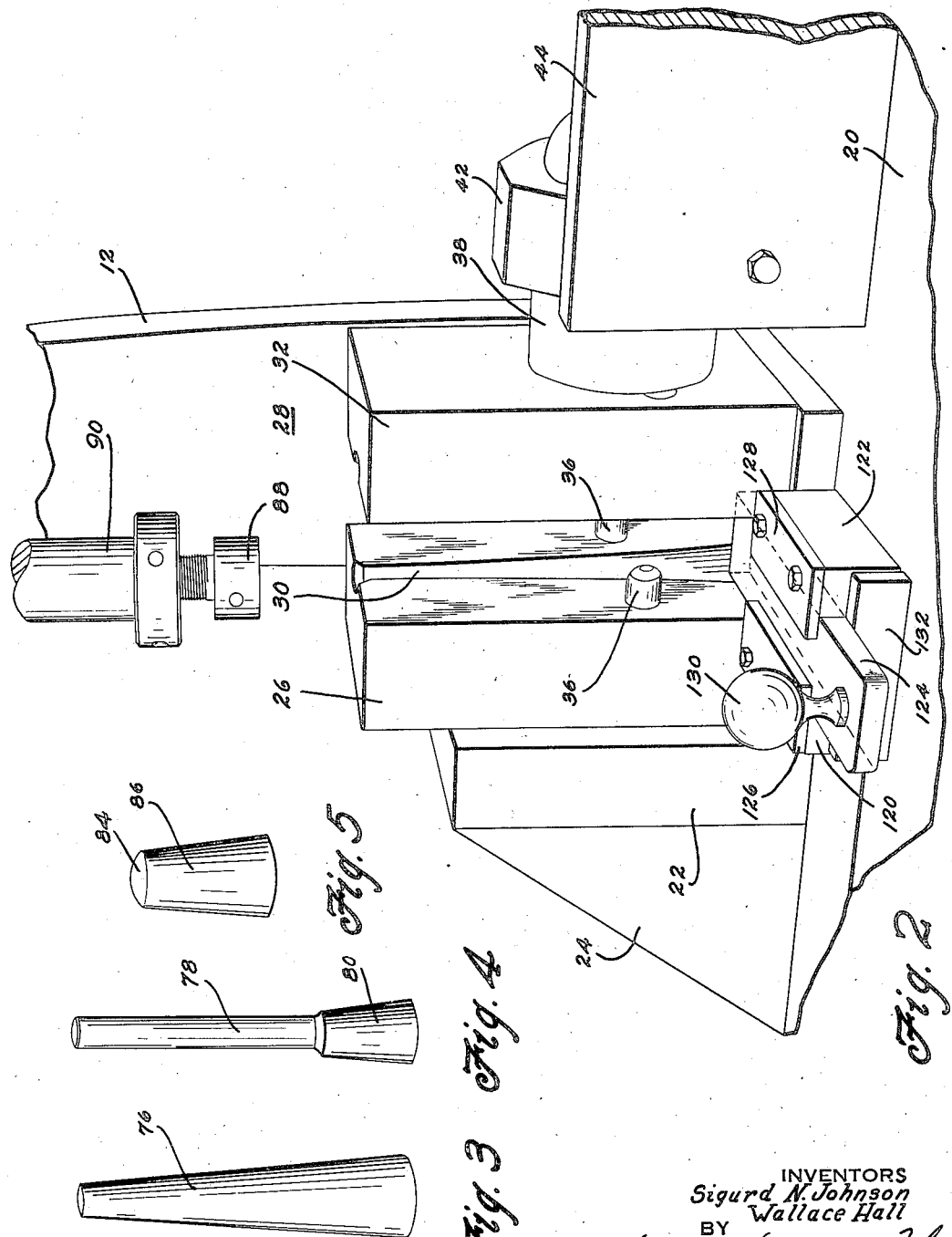

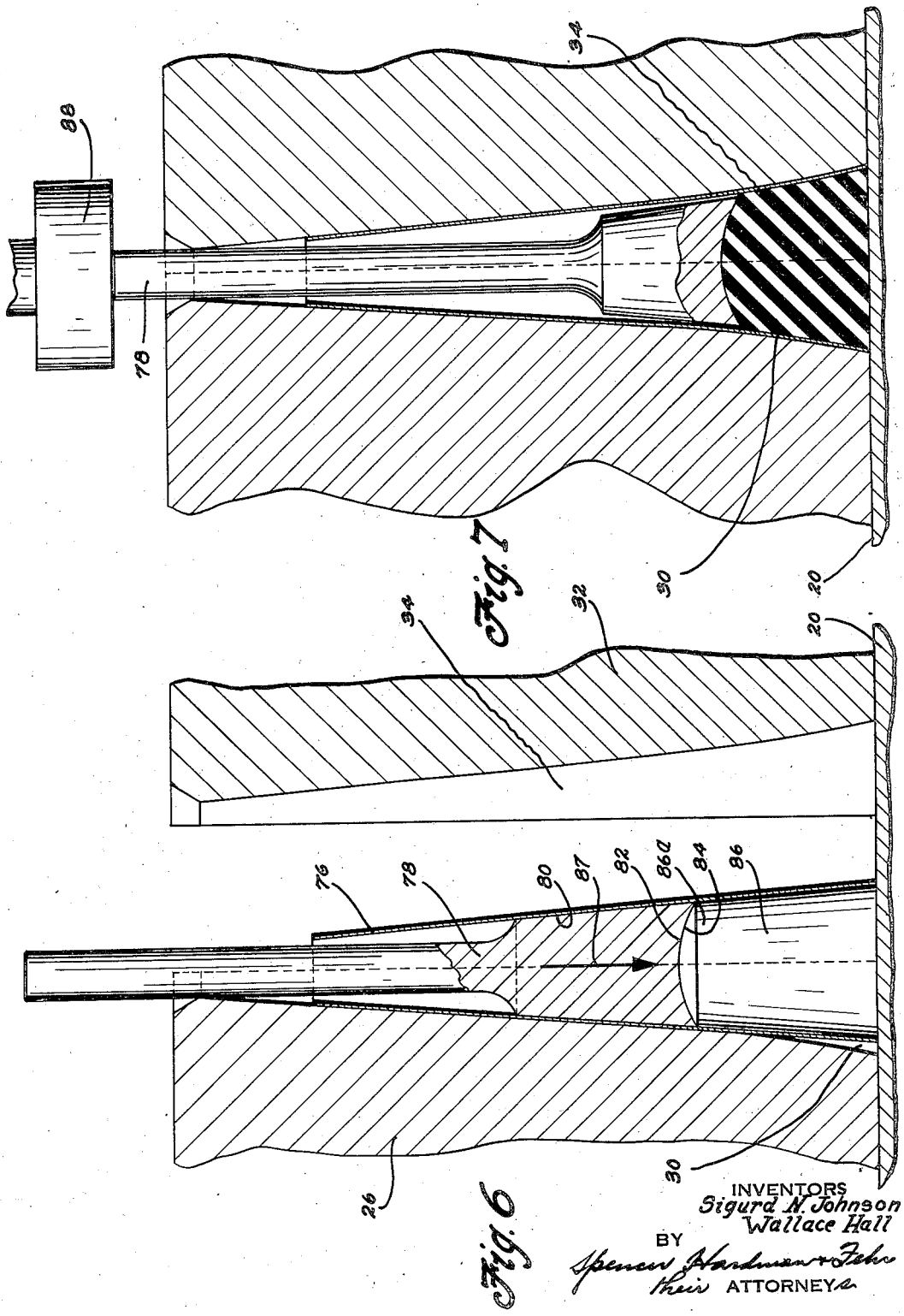

2,037,795

UNITED STATES PATENT OFFICE 2,037,795

APPARATUS FOR EXPANDING ARTICLES

Sigurd N. Johnson and Wallace Hall, Anderson, Ind., assignors, by mesne assignments, to General Motors Corporation, Detroit, Mich., a corporation of Delaware Application August 17, 1933, Serial No. 685,510

4 Claims. (Cl. 113—44)

This invention relates to an apparatus for deforming tubular articles and more particularly for expanding tubes into an exponential shape.

It is an object of the present invention to provide an apparatus for gradually deforming progressive portions of a tube in one operation without wrinkling nor unduly straining the tube material.

Another object of the present invention is to provide an apparatus for deforming a portion of a tube into an exponential shape such that the deformed tube portion merges smoothly into the tube without leaving a mark.

These objects are accomplished by providing die members, the cooperating surfaces of which define the desired shape of the tube, and a block of elastic material, such as rubber, which is placed into a tube and then compressed in such manner that the expanding portion of the block forces the tube into engagement with the die surfaces.

Further objects and advantages of the present invention will be apparent from the following description, reference being had to the accompanying drawings wherein a preferred embodiment of one form of the present invention is clearly shown.

In the drawings:

Fig. 1 is a perspective view of a machine embodying the present invention.

Fig. 2 is an enlarged fragmentary perspective view of part of the machine.

Fig. 3 illustrates a conical tube to be expanded.

Fig. 4 illustrates a plunger for compressing the rubber block.

Fig. 5 illustrates the rubber block.

Fig. 6 is a cross-section through the two shaping dies in separated position.

Fig. 7 is a cross-section similar to Fig. 6, the dies being shown in a position in which the shaping of a conical tube is completed.

Fig. 8 is an enlarged fragmentary sectional view taken substantially on the line 8—8 of Fig. 1.

Referring to the drawings and particularly to Fig. 1, the reference numeral 10 designates a machine table which supports a machine bracket 12, having a bolster plate 14 and a hub 16. Secured to bolster plate 14 by screws 18 is a supporting plate 20 to which is attached in any suitable manner, such as by welding, a plate 22 which is also welded to two ribs 24, integral with or welded to the supporting plate 20. Attached to plate 22 by screws 23 is a stationary half 26 of a die 28, the surface 30 of which defines the desired flared or exponential shape of a conical tube, as best shown in Figs. 6 and 7. Slidable on plate 20 toward and away from stationary die half 26 is a companion die half 32, the surface 34 of which is identical with that of stationary die half 26. Die half 26 is provided with two dowel pins 36, adapted to register with corresponding holes in movable die half 32, which is guided and moved toward and away from die half 26 by a cylindrical bar 38, attached to die half 32 and slidable longitudinally in an opening 40 of a guide member 42, which is attached in any suitable manner to a U-shaped bracket 44, secured to plate 20 by screws or in any other suitable manner. The free end of cylindrical bar 38 is connected by toggle joints 46 and 48 to a piston rod 50 and to a clevis 52 which is attached to the U-shaped bracket 44 by a bolt 54 of said clevis and a nut 56. Piston rod 50 is connected with a piston in a cylinder 58, pivotally mounted as at 60 to a plate 62 which is secured by welding or in any other suitable manner to a column 64, mounted in any suitable manner on a floor plate 65. Two spaced tie-bars 66 and 68 are secured by welding with one end to plate 62 and with the other end to the U-shaped bracket 44, thus tying plate 62 and bracket 44 together. Attached in any suitable manner to tie bar 66 is a plate 70 on which is mounted a valve 72. This valve is of any conventional type and is so constructed that upon shifting of valve lever 74 by an operator into one position, one side of cylinder 58 is communicating with any suitable fluid pressure supply (not shown), whereas the other cylinder side is vented. Upon shifting of valve lever 74 into the other position, said one cylinder side is vented and said other cylinder side is communicating with the fluid pressure supply. Consequently, the shifting of valve lever 74 by an operator results in actuation of the toggle joints 46, 48, either to cause the movable die half 32 to approach the stationary die half 26 or to move the movable die half away therefrom.

Prior to the placing by the operator of a conical tube 76 into engagement with surface 30 of die half 26, as illustrated in Fig. 6, the operator first inserts from the wider end of said conical tube a plunger or ram 78 whose frustro conical portion 80 corresponds to the conical tube and whose lower end surface 82 is concave and bears against the convex end surface 84 of a frustroconical block 86 of elastic material, such as rubber. This block is also inserted by the operator into the conical tube prior to the placing of the latter into engagement with the surface 30 of stationary die half 26. When the conical tube 76 is properly placed into engagement with the die surface 30 of die half 26, it will be observed from Fig. 6 that the conical tube as well as the rubber block are resting against the supporting plate 20 and the plunger is resting with its concave end surface against the convex end surface of the block. Following the placing of a conical tube into engagement with the die surface 30 of stationary die half 26, the movable die half 32 is caused to move into cooperative engagement with stationary die half 26 by manipulation of the valve lever 74 by the operator.

In order to force the conical wall of tube 76 against the die surfaces 30 and 34, plunger 78 is urged longitudinally in the direction of arrow 87 (see Fig. 6) to compress block 86 so that the laterally expanding portion thereof forces the tube wall to be expanded into engagement with the die surfaces 30 and 34. Plunger 78 is urged in the direction of arrow 87 by a head 88, longitudinally adjustably received by one end of a cylindrical bar 90 which is guided for longitudinal movement in hub 16 of bracket 12, and whose upper end is pivoted to a lever 92 which is attached by links 94 and 96 to the bracket 12. The free end of lever 92 pivotally receives as at 98 a piston rod 100 of a piston (not shown) which is received by a cylinder 102, one end of which is pivotally mounted as at 104 to a lug 106 of the bracket 12. Admission of fluid pressure to either side of cylinder 102 is controlled by a foot operated valve 108 which is mounted in any suitable manner to the floor plate 65. A conduit 110 connects the valve with any suitable supply of fluid pressure (not shown), and conduits 112 and 114 connect the valve with the two sides of cylinder 102. Valve 108 may be of any well known type. In the present instance there is shown a conventional two-way valve 108 actuated in a conventional manner, and since the valve does not form any part of the present invention, no further description thereof is deemed necessary.

In order to prevent injury to the hands of the operator in case valve 72 is accidentally operated so as to cause movement of the movable die half into engagement with the stationary die half while the operator places a conical tube between the two separated die members, the following safety arrangement is provided. Mounted on the supporting plate 20 are spaced guide ways 120 and 122, guiding a plate 124 for movement toward and away from the die members. Gib plates 126 and 128 retain plate 124 in the guideways 120 and 122, respectively. A knob 130 is attached in any suitable manner to plate 124. Interposed between a depending lug (not shown) of the plate 124 and a bar 132 is a compression spring (not shown) which normally urges plate 124 toward the die members. When the operator manipulates valve 72 in such manner as to cause separation of the die members, the plate 124 will be urged between the two die members as soon as the latter have sufficiently separated as illustrated in Fig. 2. Therefore, if valve 72 is inadvertently manipulated as explained above, the die members are unable to close due to the interposition of plate 124. At the time the operator wants to close the die members for a new operation, he first retracts plate 124 from between the die members by means of knob 130 and holds it in retracted position until after he manipulates valve 72 in a manner to cause the die members to move into the position shown in Fig. 7.

Upon compression of block 86 in the manner indicated in Figs. 6 and 7, the periphery of the block at first expands uniformly and grips the wall of the conical tube. With increasing compression of the block 86 those portions thereof which are closest to the plunger 78 will then at first be comparatively more compressed than the remainder of the block due to the increasing frictional resistance offered by the tube wall to the block periphery. Consequently there will first take place a deformation of that tube portion which is adjacent the top portion 86a of the block. Upon further exertion of pressure upon the block, the top portion thereof cannot expand any further due to the fact that the adjacent tube portion is already forced into engagement with the die surfaces 30 and 34; the further pressure is therefore transmitted through the compressed top portion of the block to the next lowermost block portion whereupon another tube portion is forced into engagement with the die surfaces. These steps repeat themselves until the entire tube portion to be expanded is progressively forced into engagement with the die surfaces. It is therefore obvious that compression of the rubber block 86 results in a gradual expansion of progressive tube portions into engagement with the die surfaces. Such gradual expansion of progressive tube portions also prevents the formation of wrinkles in the deformed tube wall as can be readily understood. Experience has also taught that the transmission of pressure from the plunger 78 to the block 86 through the concave and convex surfaces 82 and 84 respectively, thereof prevents the rubber of block 86 to flow between the plunger 78 and the interior wall of the tube during the compression of said rubber block and causes a most uniform compression of consecutive layers thereof.

While the form of embodiment of the present invention as herein disclosed, constitutes a preferred form, it is to be understood that other forms might be adopted, all coming within the scope of the claims which follow.

What is claimed is as follows:

1. An apparatus for expanding frustro-conical hollow articles comprising, in combination, a supporting plate; a form die adapted to receive an article standing on the supporting plate; a tapered block of elastic material insertable into the article and resting with its larger end surface on the supporting plate, the smaller end surface of said block being convex; a plunger comprising a stem of smaller diameter than the smallest diameter of the article and a frustro-conical portion having a concave end surface, said plunger being insertable into the article from the wider end thereof and bearing with its concave end surface against the convex end surface of the block; and means for exerting an axial force against the stem of the plunger whereby the expanding portions of the compressed block force the adjacent article wall into engagement with the die surface.

2. An apparatus for expanding frustro-conical hollow articles comprising, in combination, a forming die adapted to receive an article; a block of elastic material insertable into the article; and means for compressing the block in the article to force the latter into engagement with the die wall, said means including a movable ram insertable into the article and having a concave surface engaging the block to transmit its compressing force to the latter.

3. An apparatus for expanding frustro-conical hollow articles comprising, in combination, a forming die adapted to receive an article; a frustro-conical block of elastic material insertable into the article and having a convex end; and means for compressing the block in the article to force the latter into engagement with the die wall, said means including a movable ram insertable into the article and having a concave surface engaging the convex end of the block to transmit its compressing force to the latter.

4. An apparatus for expanding frustro-conical hollow articles comprising, in combination, a forming die adapted to receive an article; a frustro-conical block of elastic material insertable with its smaller convex end head-on into the article from the wider end thereof; and means for compressing the block in the article to force the latter into engagement with the die wall, said means including a movable ram insertable into the article from the smaller end thereof and having a concave surface engaging the convex surface of the block to transmit its compressing force to the latter.

SIGURD N. JOHNSON.
WALLACE HALL.